United States Patent [19]
Kalicki et al.

[11] 3,901,421
[45] Aug. 26, 1975

[54] BICYCLE RACK

[76] Inventors: Richard J. Kalicki, 122 Algonquin; Thomas W. Jalovec, 306 Illinois St., Park Forest, Ill. 60466

[22] Filed: Aug. 2, 1973

[21] Appl. No.: 384,981

[52] U.S. Cl. ............... 224/29 R; 211/17; 211/20; 224/42.03 B; 224/42.1 E
[51] Int. Cl. ............................................. B60p 3/06
[58] Field of Search....... 224/29 R, 42.03 B, 42.1 E, 224/42.1 F; 214/450; 211/17, 18, 19, 20, 21, 22

[56] References Cited
UNITED STATES PATENTS

| 569,289 | 10/1896 | Lynch | 211/18 |
|---|---|---|---|
| 613,773 | 11/1898 | Neumann | 211/17 |
| 3,260,429 | 7/1966 | Yuda et al. | 224/42.1 R |
| 3,528,578 | 9/1970 | Schoenberger | 214/450 |
| 3,687,318 | 8/1972 | Casey et al. | 214/450 |
| 3,753,579 | 8/1973 | Kurilich | 224/42.03 B |
| 3,770,133 | 11/1973 | Kolker | 211/19 |

FOREIGN PATENTS OR APPLICATIONS

| 325,730 | 5/1903 | France | 211/22 |

*Primary Examiner*—Frank E. Werner
*Assistant Examiner*—Gary Auton
*Attorney, Agent, or Firm*—Wegner, Stellman, McCord, Wiles & Wood

[57] ABSTRACT

A bicycle rack for transporting, in upright position, one or a plurality of bicycles and having a base provided with a pair of spaced-apart base members with provision for attachment to a part of a vehicle or other supporting surface and with elongate upwardly open channel members mounted to the base in transversely extending relation to the base members to receive both wheels of a bicycle in one of the channel members and with the continuity thereof permitting rolling of a bicycle therealong as the bicycle is mounted in upright position on the rack. A frame member of a generally inverted U-shape extends upwardly from the base and has a pair of legs associated one with each of the base members and carrying a pair of clamp members extending from opposite sides thereof toward a position to have a clamp device on the end of each clamp member engage a part of a bicycle frame and hold the bicycle securely in position and as supported by the channel member.

8 Claims, 9 Drawing Figures

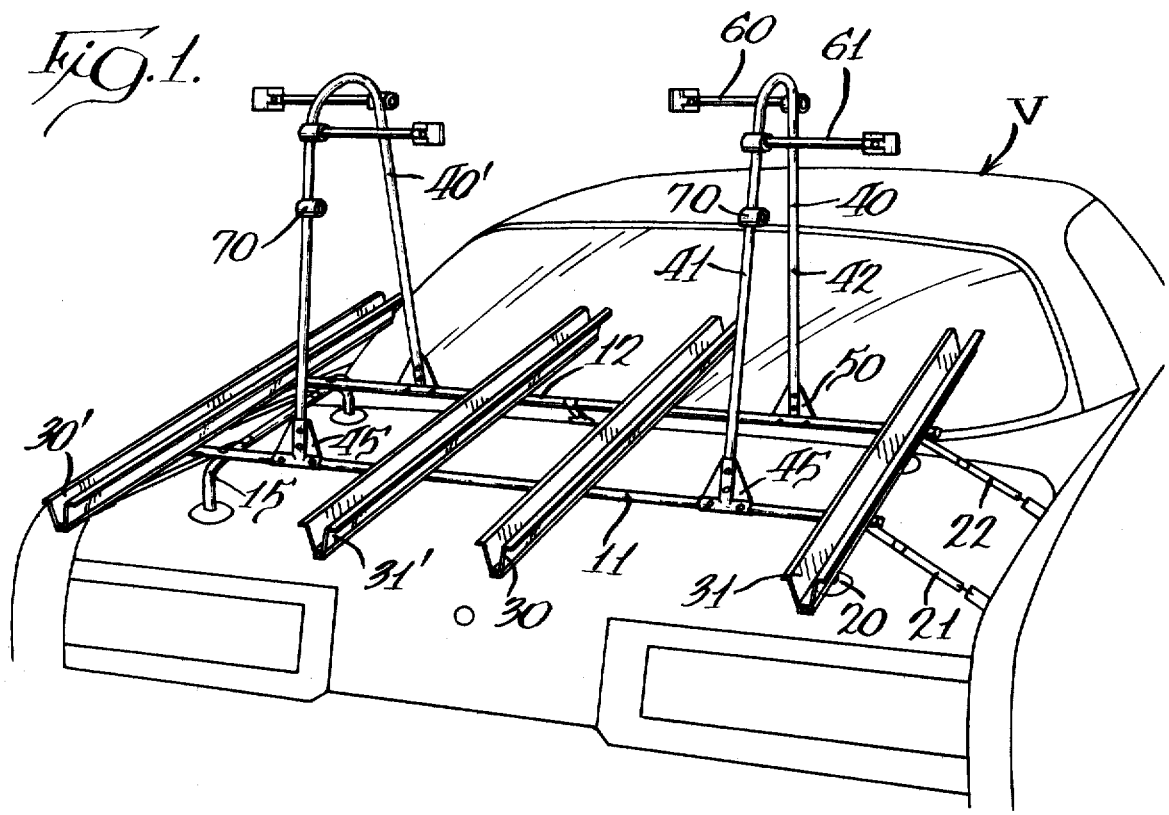
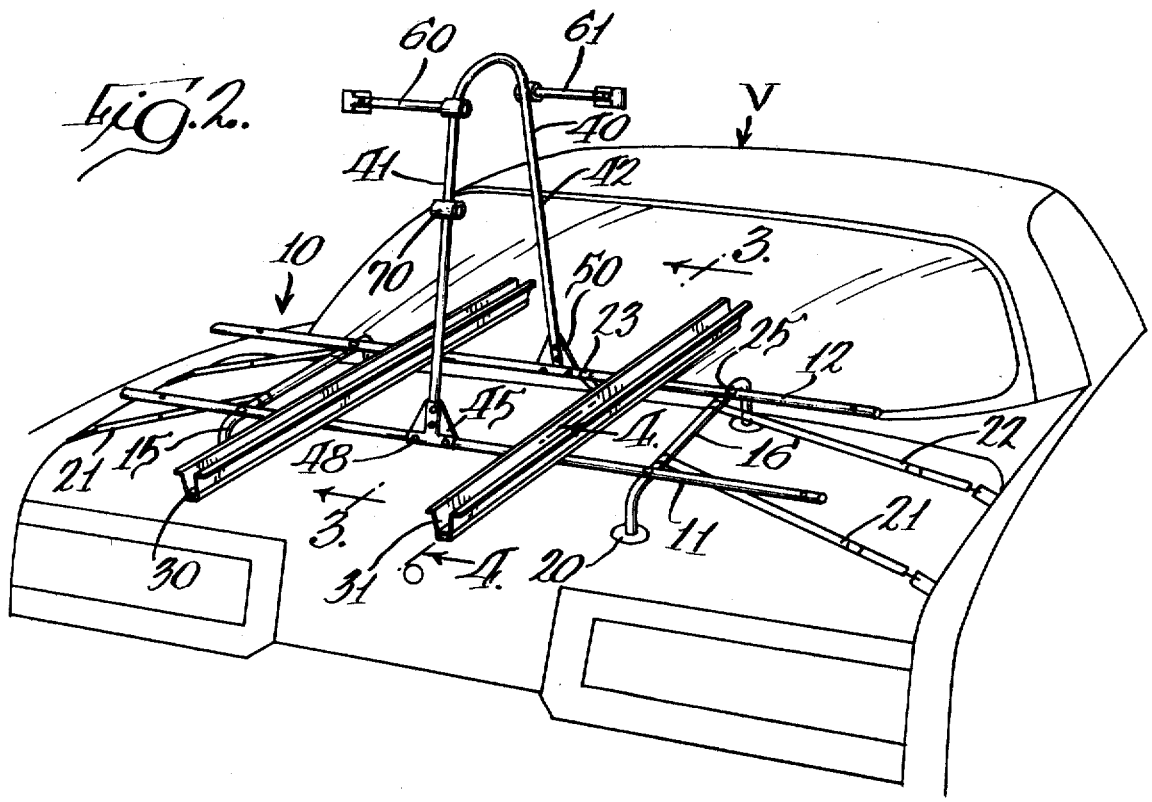

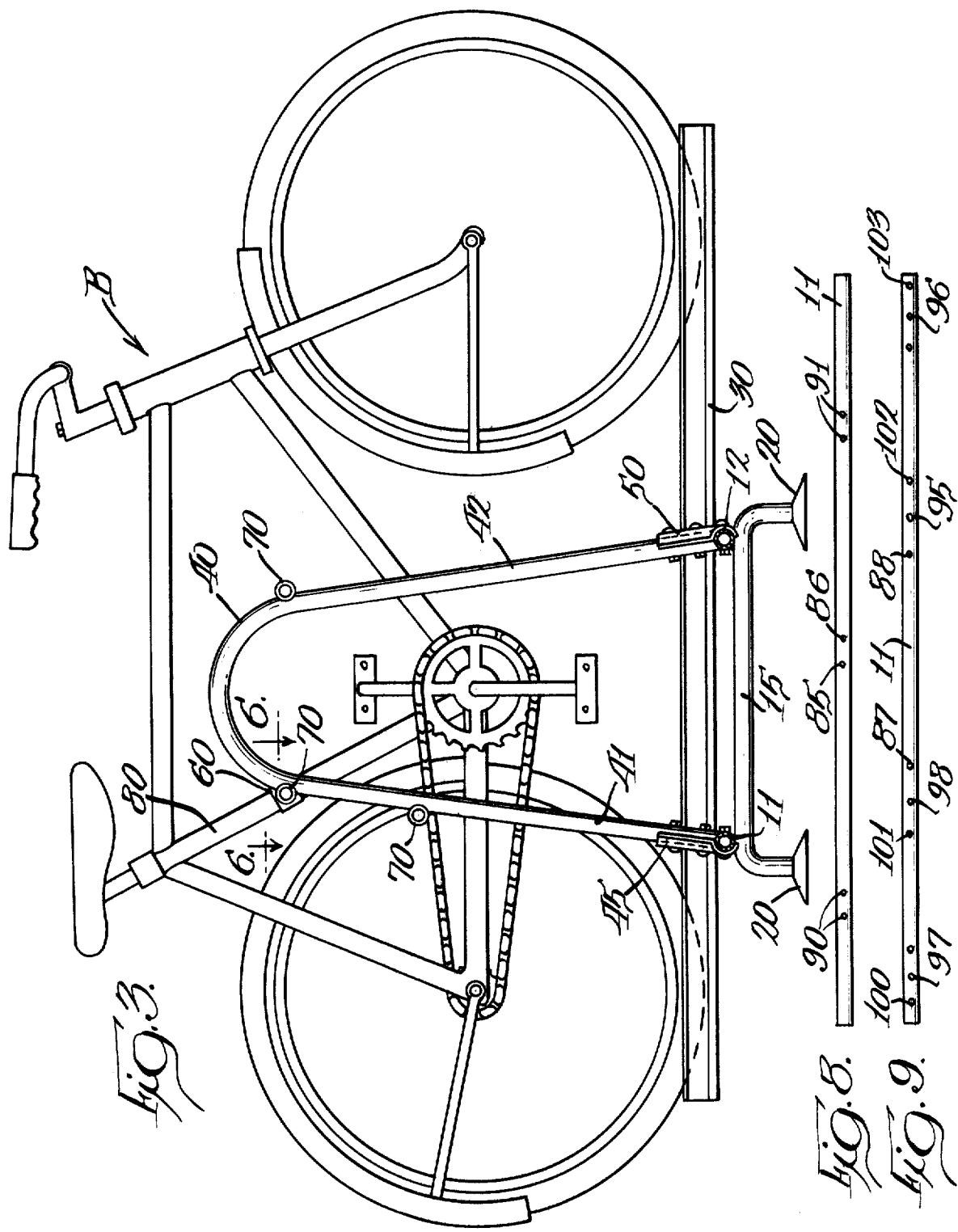

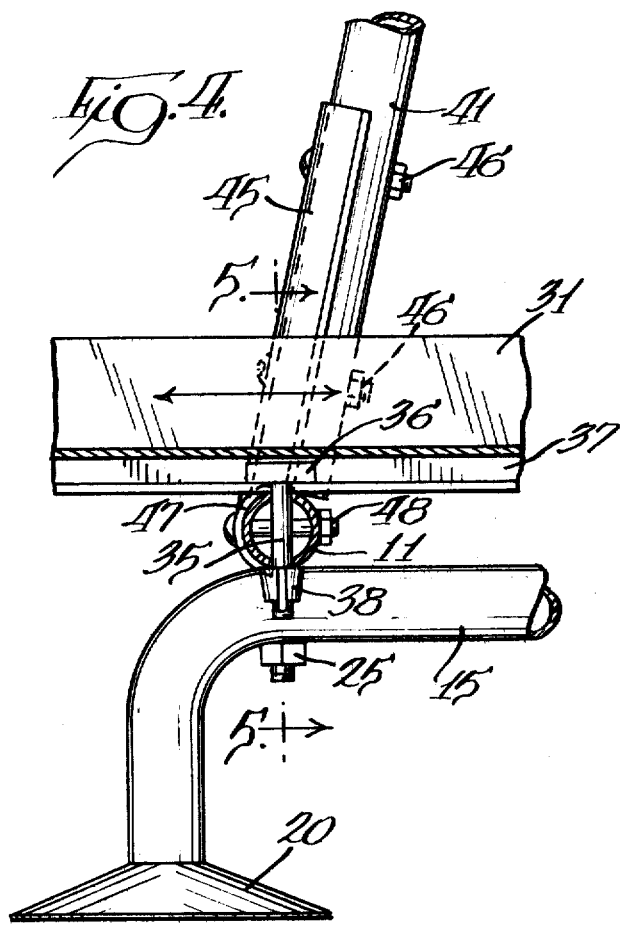
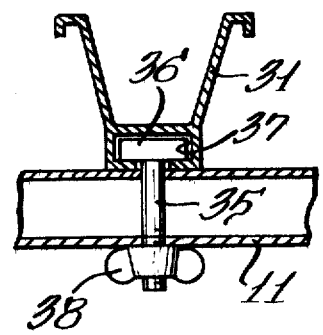
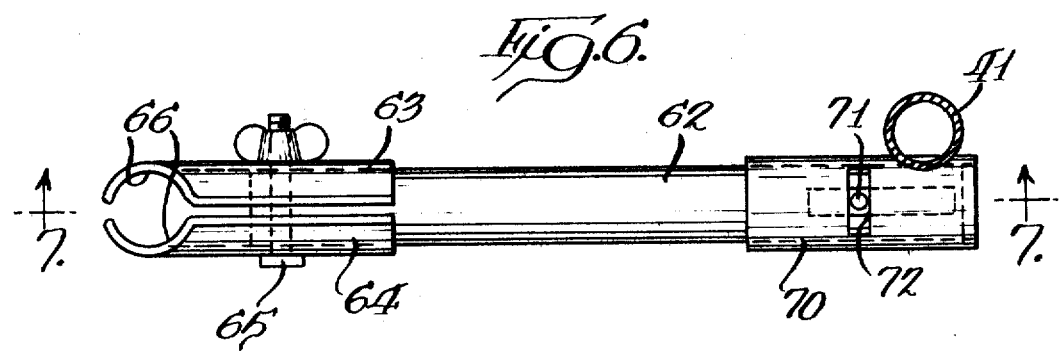
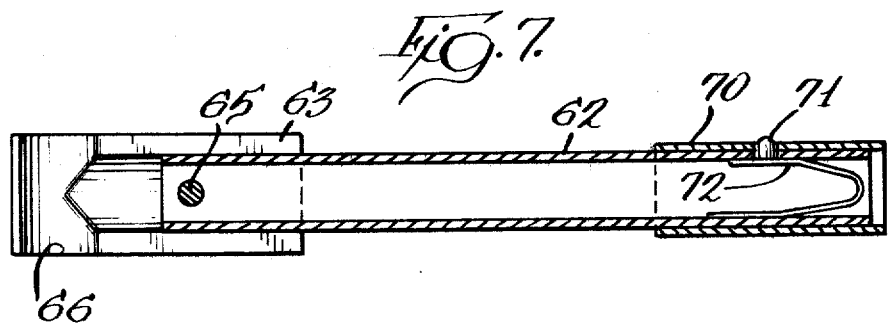

BICYCLE RACK

BACKGROUND OF THE INVENTION

This invention pertains to a bicycle rack for transporting a plurality of bicycles in upright position and with the rack being mountable to the trunk or roof of a vehicle and with positioning of bicycles on the rack for transport thereof being easily accomplished.

The bicycle rack disclosed herein may be used as a free-standing rack; however, it is primarily designed for use in association with a vehicle by being mounted on the trunk lid or the roof of the vehicle. A variety of racks have been used in the past for carrying one or more bicycles. Included in these are racks that mount to a bumper or other support and on which hooks are positioned for hanging of bicycles therefrom. Various other types of bicycle carriers are shown in U.S. Pat. Nos. 3,137,422, 3,204,839, 3,260,429, 3,458,073, and 3,581,962. Several of these patents show the use of frames with suction cups for attachment to the vehicle and with various types of clamps for holding bicycles in either upright or inverted position. These patents require substantial manipulation of the bicycles in positioning thereof on the rack or of the structure of the rack to hold the bicycles in association with the rack.

A number of additional patents show various structures for holding a bicycle or a part thereof including U.S. Pat. Nos. 420,761, 569,289, 594,627, 605,429, 2,460,945 and 2,803,349. One or more of these patents show the use of a channel member for holding one or both bicycle wheels and various clamp structures for engaging part of a bicycle frame.

None of the foregoing patents show a bicycle rack capable of mounting on a vehicle or the like with structure for holding a plurality of bicycles in upright position wherein the rack has a rectangular base with a plurality of channel members for rollingly receiving the wheels of bicycles as the bicycles are loaded on the rack and with a generally upright frame member disposed between a pair of channel members and carrying variably positionable and adjustable clamp members for holding a pair of bicycles in the associated channel members. Additionally, none of the patents show a rack mountable on a trunk lid with parts thereof movable to permit opening of the trunk while the rack remains attached to the lid.

SUMMARY OF THE INVENTION

A primary feature of the bicycle rack disclosed herein is to provide such a rack mountable either on the trunk or roof of a vehicle with provision for mounting a plurality of bicycles in generally upright position and with the rack having fixed elongate channel members into which bicycle wheels may be rollingly received and with a clamp structure including a generally upright frame member disposed between a pair of channel members and with variably positionable clamp members extending outwardly therefrom in opposite directions to engage a part of the frame of bicycles positioned in a pair of channel members to either side of the upright frame member.

Another feature of the invention is to provide a bicycle rack capable of mounting on different width portions of a vehicle by the base thereof having adjustably mounted leg units and with the base constructed to mount structure for transporting two bicycles or modified with relocation of the structure for transporting two bicycles in association with additional structure to provide for carrying two additional bicycles.

Another advantage of the structure disclosed herein is that the channel members are elongate and of sufficient length to rollingly receive and support both wheels of a bicycle and with the channel members being mounted for secure attachment to the base and for partial release sufficient to permit lengthwise adjustment of the channel members along their length to provide either for staggering of the channel members one with respect to the other for staggered mounting of bicycles, if necessary, and also to permit shift of the channel members when the rack is carried on a trunk in order to permit opening of the trunk while the rack remains in association with the trunk lid.

Still another feature of the invention is to provide a bicycle rack for transporting a plurality of bicycles in upright position wherein the structure of the bicycle rack may be easily assembled and disassembled by the use of threaded bolt-type fasteners holding the parts in assembled relation and permitting simple modification of the rack to carry either two bicycles or four bicycles by the association of the structure and threaded fasteners with pre-formed openings in the base members of the rack.

BRIEF DESCRIPTION OF THE DRAWINGS

FIG. 1 is a perspective elevational view of the bicycle rack for transporting four bicycles and shown in association with a vehicle by attachment to the trunk lid;

FIG. 2 is a view similar to FIG. 1 showing the bicycle rack assembled and mounted for transport of two bicycles;

FIG. 3 is a vertical section, on an enlarged scale, taken generally along line 3—3 in FIG. 2;

FIG. 4 is a fragmentary vertical section taken generally along the line 4—4 in FIG. 2;

FIG. 5 is a vertical section taken generally along the line 5—5 in FIG. 4;

FIG. 6 is a plan section, taken generally along the line 6—6 in FIG. 3, and without the bicycle shown in association therewith;

FIG. 7 is a bottom plan section, taken generally along the line 7—7 in FIG. 6;

FIG. 8 is a front elevational view of one of the base members of the base of the bicycle rack; and FIG. 9 is a plan view of the base member shown in FIG. 8.

DESCRIPTION OF THE PREFERRED EMBODIMENT

Referring initially to the bicycle rack assembled to transport two bicycles as shown in FIG. 2, a base, indicated generally at 10, is supported relative to the trunk lid of a vehicle, indicated generally at V. Alternately, the bicycle rack may be mounted on the roof of the vehicle. The base 10 has a pair of spaced-apart base members 11 and 12 which extend transversely to the length of the vehicle and which mount a pair of leg units 15 and 16.

Each of the leg units 15 and 16 has downturned ends suitably fitted with a suction cup 20 to engage and hold against the surface of the trunk lid. A pair of adjustable straps 21 and 22, with engaging hooks at their end extend from each of the leg units to securely attach the rack to the edges of the trunk lid. An additional adjustable strap device with a hook is indicated at 23 to further securely hold the rack to the vehicle by engaging along the forward edge of the trunk lid. The leg units 15 and 16 are assembled to the base members 11 and 12 to form the base by suitable threaded fastening devices passing through openings in the leg units and the base members 11 and 12 to hold the parts in assembled relation and with one of the fastening devices indicated generally at 25. The parts of the base are shown as round tubular stock. However, these parts may be formed of square cross-section hollow tubing.

In the two-bicycle rack of FIG. 2, a pair of identical upwardly open elongate channel members 30 and 31 extend transversely of the base members 11 and 12 in spaced-apart relation and generally lengthwise of the vehicle. As shown particularly in FIG. 5, the channel member is of a shape having upwardly diverging side walls and may be an extrusion. Each of the channel members is securely fastened to each of the base members 11 and 12 by a threaded fastening bolt 35 having a head 36 captured in a slot 37 in the underside of the channel member with the shank of the bolt extending through an opening in the walls of a base member and with a wing nut 38 holding the parts in tightly secured relation. With this construction, the four wing nuts 38 for the threaded fastening bolts may be loosened whereby the channel members 30 and 31 are not released from the base but are free for adjustment along their length relative to the base. This permits staggered relation of the channel members as may be necessary in mounting a pair of bicycles. This also provides for rearward movement of the channel members to a position whereby they will not contact the rear window of the vehicle as the trunk lid is raised. This permits opening of the trunk without removal of the rack from the trunk lid.

A one-piece inverted U-shape frame member 40 extends upwardly from the base at a location between the pair of channel members 30 and 31. This frame member has legs 41 and 42 which extend downwardly and are associated in fastened relation with the base members 11 and 12, respectively. As shown particularly in FIG. 4, an attaching bracket 45 has a curved part fitting the lower end of the leg 41 and attached thereto by bolts 46 with a transversely extending part 47 curved to partially wrap about the base member 11 and having a pair of fastening bolts 48 connecting the part 47 to the base member 11. A similar attaching bracket 50 associates the leg 42 of the frame member with the base member 12.

A pair of clamp members are associated with the frame member 40 and extend in opposite directions therefrom for association, one with each of the channel members 30 and 31. These clamps members are shown at 60 and 61. The structure of the clamp members is shown particularly in FIGS. 6 and 7 wherein the clamp member has a body formed as an elongate hollow rod 62 and which has a clamp device at one end including a clamp element 63 welded to the rod and a removable clamp element 64 which together form a generally cylindrical clamp surface for engaging a portion of the tubular frame of the bicycle and which are held in clamped relation by a bolt and wing nut 65. The clamping elements have their gripping surfaces 66 suitably coated with a material to prevent injury to the surface finish of the bicycle frame.

The opposite end of the elongate rod 62 of the clamp member is positioned within a tubular housing 70 welded to the leg 41 of the frame member. The clamp member is rotatably mounted within the housing 70 with the clamp member being releasably retained in the housing by a retractable pin 71 engaging in a slot 72 in the wall of the housing 70. The clamp member may rotate within limits as determined by movement of the pin 71 in the slot 72 and is retained in association therewith. The rotation permits alignment of the clamp member with a part of the bicycle frame. In the event the clamp member is to be removed, the pin 71 is depressed against the action of a spring member 72 fastened within the elongate rod 62 and which carries the pin 71. The pin 71 is depressed sufficiently to be retracted from the slot 72 with the result that the elongate rod may be removed from the housing. This removability is of particular significance because there are a plurality of the housings 70 variably positioned about the frame member 40. As shown in FIGS. 2 and 3, there are three of the housings 70 whereby any two of the housings may be used for receiving the clamp members 60 and 61 for holding a pair of bicycles in the channel members 30 and 31.

In utilization of the bicycle rack as shown in FIG. 2, a bicycle may be positioned with its front wheel in the leading end of the channel member 30 or 31 and the bicycle then rolled forwardly and lifted to position both wheels in the channel member. The clamp member 61 may then be rotatably oriented with the clamp elements 63 and 64 in released position and brought into relation with a portion of the frame of the bicycle rack. The clamp device is then tightened to hold the bicycle in association with the channel member of the rack. The same procedure may be followed for a bicycle brought into position in the other channel member. The mounting of a bicycle in secured relation in the rack is shown in FIG. 3 wherein the bicycle, indicated generally at B, has a part 80 of the frame engaged by a clamp member 60 mounted in a housing 70 to securely hold the bicycle in association with the rack.

The bicycle rack disclosed herein is economically manufactured and shipped by being shippable in the flat and easily assembled by placing the parts in the proper associated relation and securing them together by threaded fasteners. Additionally, the bicycle rack may be sold as a basic unit for mounting two bicycles, as shown in FIG. 2, and with the rack being easily modified for carrying four bicycles, as shown in FIG. 1. Additionally, these two Figures show the leg units 15 and 16 variably spaced apart to accommodate mounting on different width vehicles or at different locations on a vehicle. The variable capacity of the bicycle rack is best illustrated by reference to the two views of the base member 11 shown in FIGS. 8 and 9. The construction of the base member 12 is the same. In the embodiment of FIG. 2, for carrying two bicycles there are two centrally located wall passages 85 and 86 for receiving the fastening bolts 48 for mounting the frame member 40. The wall passages 87 and 88 receive the fastening bolts 35 to secure the channel members 30 and 31 to the base. When four bicycles are to be transported, the upright frame member 40 and a second identical frame member are mounted by attachment to the wall passages 90 and 91 in the base member 11. This is shown in FIG. 1 wherein the frame member 40 has been shifted to the right and aligned with wall passages 91 and a second frame member 40' of the same construction as the frame member 40 is mounted to the base member by the attaching bolts being extended through wall passage 90 in the base member. The channel members 30 and 31 are again positioned at opposite sides of the frame member 40 by attachment to the base member 11 through wall passages 95 and 96. Two additional channel members 30' and 31' of the same construction as channel members 30 and 31 are similarly positioned at opposite sides of the frame member 40' and are similarly mounted in association with wall passages 97 and 98 in the base member 11. The additional wall passages 100, 101, 102, and 103 provide the variable locations for attaching the leg units 15 and 16. The base member 12 has the same arrangement of wall passages as the base member 11.

In the event a user wishes to transport only two bicycles and buys the basic package shown in FIG. 2, it is always possible later to purchase the additional frame member 40' and the channel members 30' and 31' as well as the necessary securing bolts and convert the two-bicycle rack into a four-bicycle rack. A user initially desiring to transport four bicycles would purchase the basic unit as well as the modification kit at the time of original purchase.

What is claimed is:

1. A bicycle rack for a plurality of bicycles comprising a base having a pair of spaced-apart base members, a pair of spaced-apart elongate upwardly open channel members extending transversely to and overlying said base members, each of said channel members receiving the wheels of a bicycle disposed in upright position on the rack, a frame member of a generally inverted U-shape with a pair of legs secured one to each of the base members and extending upwardly between said channel members, a plurality of housings fastened at least one to each leg of the frame member and each having an open-ended central bore extending transverse to the plane of the frame member, a plurality of clamp members with at least one extending outwardly from each side of said frame member to a position to clamp and hold a bicycle having its wheel positioned in a channel member, each of said clamp members having an elongate rod insertable into either end of said open-ended central bore, and coacting means between said housing and an elongate rod for releasably and rotatably retaining a clamp member in association with a housing, said coacting means includes a slot in a housing wall extending for a part of the circumference thereof, and said elongate rod has a retractable pin engageable in the slot to rotatably retain the rod in the housing but permit disassociation therebetween, at least two of said housings are at different heights to provide variable height positioning of a clamp member selectively extending to either side of the frame member, and said retractable pin being engageable in said slot in either direction of extension of the clamp member.

2. A bicycle rack as defined in claim 1 including first releasable bolt means passing through first openings in said base members to secure the frame member to the base, second releasable bolt means passing through second openings in the base members to secure the channel members to the base, said base members having a plurality of sets of first and second openings whereby one or two of said frame members may be secured to said base and with a pair of channel members associated with each frame member and positioned one to either side thereof.

3. A bicycle rack as defined in claim 1 wherein said base includes a pair of leg units each having an intermediate section underlying said base members and downturned ends defining legs for engagement with a support surface such as a vehicle, and bolt means coacting with some of a plurality of openings in said base members and said intermediate sections to permit variation in the spacing of said leg units relative to each other and accommodate mounting of the rack on different width vehicles.

4. A bicycle rack as defined in claim 1 including releasable bolt means slidably connected to the underside of the channel members whereby said channel members may be shifted lengthwise thereof relative to said base for the purpose of either staggering said channel members upon loosening of the releasable bolt means or for shifting the channel members to a position which facilitates opening of a vehicle trunk when the rack is mounted on said trunk.

5. A bicycle rack as defined in claim 1 wherein said elongate rod is hollow, a spring member mounted within said elongate rod and carrying said pin, and said slot being intermediate the ends of the housing.

6. A bicycle rack as defined in claim 1 wherein said channel members each have upwardly diverging relatively thin side walls.

7. A bicycle rack for attachment to a vehicle for transporting a plurality of bicycles comprising, a base having a pair of elongate base members, a pair of leg units each having an intermediate section underlying said base members and downturned ends engageable with a vehicle, said intermediate sections being connected to said base members to hold the base members in assembled relation, a plurality of upwardly open elongate channel members with upwardly diverging sides extending transversely to said base members, a frame member of an inverted generally U-shape associated with each pair of channel members and having a pair of legs associated one with each base member, a plurality of housings with open-ended bores mounted on said frame member at different heights, said housings at different heights providing variable height positioning of a clamp member selectively extending to either side of the frame member, a pair of oppositely extending clamp members mounted on the frame member with each having an elongate rod in a housing and a clamp device to engage a bicycle frame, means including threaded fasteners for securing said channel members and frame member to said base members, and passages through said base members for receiving said threaded fasteners, said passages being in sufficient number and related whereby the rack may have two channel members and an intermediate frame member centrally positioned on the base for holding two bicycles or four channel members and two intermediate frame members symmetrically positioned on the base for holding four bicycles.

8. A bicycle rack as defined in claim 7 including threaded fasteners and passages in the base members for connecting the leg units to the base members, and said base members having a plurality of sets of said last mentioned passages at different locations along the length of said base members for variable positioning of the leg units.

* * * * *